United States Patent
Lopez

(10) Patent No.: US 8,321,875 B2
(45) Date of Patent: Nov. 27, 2012

(54) SELECTIVELY UPDATING WEB PAGES ON A MOBILE CLIENT

(75) Inventor: Frank Lopez, Tracy, CA (US)

(73) Assignee: iAnywhere Solutions, Inc., Dublin, CA (US)

( * ) Notice: Subject to any disclaimer, the term of this patent is extended or adjusted under 35 U.S.C. 154(b) by 17 days.

(21) Appl. No.: 12/852,892

(22) Filed: Aug. 9, 2010

(65) Prior Publication Data

US 2010/0299676 A1   Nov. 25, 2010

Related U.S. Application Data

(63) Continuation of application No. 11/716,613, filed on Mar. 12, 2007, now Pat. No. 7,774,788.

(60) Provisional application No. 60/905,298, filed on Mar. 7, 2007.

(51) Int. Cl.
  *G06F 13/00* (2006.01)
(52) U.S. Cl. ......... 719/311; 719/313; 709/217; 709/219
(58) Field of Classification Search .................. 719/311, 719/313; 709/217, 219
  See application file for complete search history.

(56) References Cited

U.S. PATENT DOCUMENTS

| | | | |
|---|---|---|---|
| 6,771,760 B1 * | 8/2004 | Vortman et al. | 379/209.01 |
| 7,099,926 B1 * | 8/2006 | Ims et al. | 709/217 |
| 7,451,455 B1 * | 11/2008 | El-Haj | 719/320 |
| 7,464,381 B1 | 12/2008 | Nickerson et al. | |
| 7,487,201 B1 | 2/2009 | Murray et al. | |
| 7,523,158 B1 | 4/2009 | Nickerson et al. | |
| 7,774,788 B2 | 8/2010 | Lopez | |
| 2002/0120685 A1 | 8/2002 | Srivastava et al. | |
| 2003/0058277 A1 | 3/2003 | Bowman-Amuah | |
| 2003/0061286 A1 * | 3/2003 | Lin | 709/205 |
| 2003/0112274 A1 * | 6/2003 | Gao et al. | 345/760 |
| 2003/0149749 A1 | 8/2003 | Carlucci et al. | |
| 2008/0147671 A1 * | 6/2008 | Simon et al. | 707/10 |
| 2008/0222504 A1 | 9/2008 | Chitturi | |

OTHER PUBLICATIONS

Cerami, Ethan. *Delivering Push*. New York: McGraw-Hill, United States (1998).
International Search Report and the Written Opinion of the International Searching Authority for International Patent Application No. PCT/US08/02880, ISA/US, Commissioner for Patents, United States, mailed Jun. 30, 2008, 7 pages.

* cited by examiner

*Primary Examiner* — Andy Ho
(74) *Attorney, Agent, or Firm* — Sterne, Kessler, Goldstein & Fox P.L.L.C.

(57) ABSTRACT

A system, method, and computer program product are provided for enabling the selective updating of web pages provided to a mobile client using, for example, AJAX technology. The system, method, and computer program product are optionally further extended to harmonize synchronization of data retrieved by other methods with data updated using AJAX. The use of AJAX technology is disclosed within the context of additional technology suites which may be substituted to achieve the same function. Additionally, the use of queuing AJAX updates is discussed.

23 Claims, 13 Drawing Sheets

SELECTIVELY UPDATING WEB PAGES ON A MOBILE CLIENT

CROSS-REFERENCE TO RELATED APPLICATIONS

This application is a continuation of U.S. patent application Ser. No. 11/716,613, filed on Mar. 12, 2007 (now U.S. Pat. No. 7,774,788 issued on Aug. 10, 2010), which claims the benefit of U.S. Provisional Patent Application No. 60/905,298, filed on Mar. 7, 2007, which are both incorporated herein by reference in their entireties.

BACKGROUND OF THE INVENTION

1. Field of the Invention

The present invention generally relates to mobile computing and, more particularly, to optimization of mobile data communications.

2. Background Art

As mobile computing platforms become increasingly ubiquitous, and with the availability of network access for the mobile computing platforms, it becomes desirable to provide users with as close an approximation to the experience of a full-featured computing platform as possible. In order to conserve space and battery power, mobile computing platforms, such as personal digital assistants ("PDAs"), frequently have small display screens, limited memory, limited processing power, and limited communications bandwidth. Such features of mobile computing platforms are often incompatible with the goal of providing users with a full-featured experience.

In order to improve the experience, intervening gateway devices have been employed for the purpose of optimizing data, such as a web page, being transmitted to a PDA. This transformation helps preserve the look-and-feel of many web pages, particularly those designed specifically for display on a PDA device, while simultaneously allowing the PDA to accomplish its goals related to portability.

One area that has been neglected thus far, and which is necessary to present a rich, interactive experience to a user engaging in data exchange with a server is the ability to rapidly update data as it is viewed by a user. For example, a user wishing to review his stock portfolio on a PDA is presented with a static list of his stock prices. If the user wishes to update the page to obtain the most recent stock prices, the user must refresh the page, causing the entire page to be downloaded again to the PDA. This process is extremely cumbersome for a device facing significant bandwidth, memory, and processing limitations.

Accordingly, what is desired is a system, method, and computer program product for the update of dynamic data within a web page on a mobile computing platform.

BRIEF SUMMARY OF THE INVENTION

The invention includes a computer-implemented method for updating a document in a computing device, in accordance with an embodiment of the present invention. The method includes the steps of requesting the document from a document gateway, wherein the document comprises a callback function, the callback function operable to replace an object within the document with updated data, receiving the document from the document gateway, displaying the document within a client software, receiving an interface script from the document gateway, triggering an update request for the object within the interface script, wherein the update request comprises a reference to the callback function, requesting updated data for the object at the interface script using an interface library from a document server, wherein the interface script accesses the interface library using an interface library wrapper, receiving the updated data at the interface library, wherein the interface library is operable to forward the updated data to the interface script, receiving the updated data at the interface script, wherein the interface script is operable to notify the callback function of the updated data in order to replace the object with the updated data, and displaying the updated document within the client software.

The invention further includes a computer program product comprising a computer usable medium having computer program logic recorded thereon for enabling a processor to update a document in a computing device, in accordance with an embodiment of the present invention. The computer program logic includes a first requesting means for enabling a processor to request the document from a document gateway, wherein the document comprises a callback function, the callback function operable to replace an object within the document with updated data, first receiving means for enabling a processor to receive the document from the document gateway, first displaying means for enabling a processor to display the document within a client software, second receiving means for enabling a processor to receive an interface script from the document gateway, triggering means for enabling a processor to trigger an update request for the object within the interface script, wherein the update request comprises a reference to the callback function, second requesting means for enabling a processor to request updated data for the object at the interface script using an interface library from a document server, wherein the interface script accesses the interface library using an interface library wrapper, third receiving means for enabling a processor to receive the updated data at the interface library, wherein the interface library is operable to forward the updated data to the interface script, fourth receiving means for enabling a processor to receive the updated data at the interface script, wherein the interface script is operable to notify the callback function of the updated data in order to replace the object with the updated data, and second displaying means for enabling a processor to display the updated document within the client software.

The invention additionally includes a system capable of updating a document in a computing device, in accordance with an embodiment of the present invention. The system includes a first module to request the document from a document gateway, wherein the document comprises a callback function, the callback function operable to replace an object within the document with updated data, a second module to receive the document from the document gateway, a third module to display the document within a client software, a fourth module to receive an interface script from the document gateway, a fifth module to trigger an update request for the object within the interface script, wherein the update request comprises a reference to the callback function, a sixth module to request updated data for the object at the interface script using an interface library from a document server, wherein the interface script accesses the interface library using an interface library wrapper, a seventh module to receive the updated data at the interface library, wherein the interface library is operable to forward the updated data to the interface script, an eighth module to receive the updated data at the interface script, wherein the interface script is operable to notify the callback function of the updated data in order to replace the object with the updated data, and a ninth module to display the updated document within the client software.

The invention also includes a computer-implemented method for updating a document displayed by a computing device, in accordance with an embodiment of the present invention. The method includes the steps of retrieving the document and an interface script, triggering an update request in the interface script for an object within the document, requesting updated data for the object using the interface script, wherein the interface script is operable to contact an interface library using an interface library wrapper to retrieve the updated data, retrieving the updated data, wherein the interface library is operable to request and receive the updated data at the request of the interface script and is further operable to forward the updated data to the interface script, and receiving the updated data at the interface script, wherein the interface script is operable to replace the object with the updated data.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
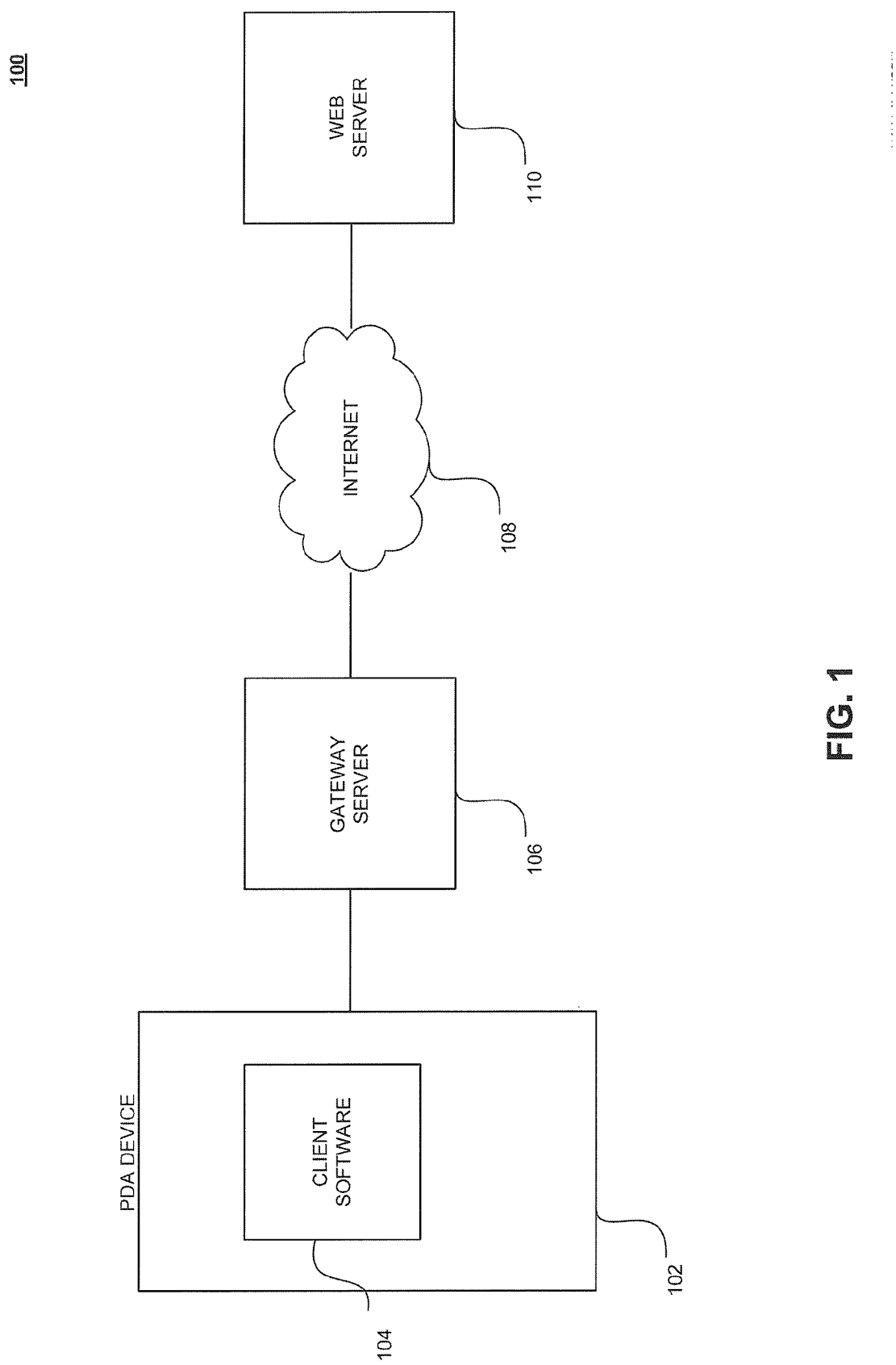
FIG. 1 illustrates a network for retrieving a document for a computing device, in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Overview

The increasing availability of wireless access to the Internet has created a significant market for portable computing devices with wireless access capabilities. Traditionally, such compact portable computing devices, commonly termed hand-held devices or personal digital assistants ("PDAs"), have had less computational power than larger computing platforms, such as laptops or personal computers ("PCs"). Due to this limited computing power, as well as other features inherent to a portable computing platform such as smaller display screens, custom applications have been developed for purposes such as optimizing the display of web pages, reducing CPU usage, reducing the quantity of network accesses, and increasing battery life.

Of particular concern to the present invention is the reduction of network accesses, among other features. One skilled in the relevant arts will appreciate that, accordingly, the techniques described herein need not be limited to a portable computing device, but can in fact be used in any computing situation where similar resource utilization problems are posed.

FIG. 1 illustrates a network 100 for a PDA device 102, in accordance with an embodiment of the present invention. PDA device 102 may be one of many devices commonly designated as PDAs, such as but not limited to a device operating according to the Microsoft Pocket PC specification with the Microsoft Windows CE operating system or Research In Motion's BlackBerry devices. As previously noted, PDA device 102 may further encompass other computational devices with any similar resource limitations as PDAs.

PDA device 102 is operable to execute client software 104. In accordance with an embodiment of the present invention, client software 104 is a web browser. PDA device 102 is connected to the Internet 108 through a gateway server 106. One or more web servers, such as web server 110, are available for access through the Internet 108. One skilled in the relevant arts will appreciate that any network, such as a corporate intranet, may be used instead of the Internet 108. Furthermore, gateway server 106 is operable to support connections from multiple PDA devices such as PDA device 102, but only a single PDA device 102 is shown for purposes of illustration.

Figure 2:
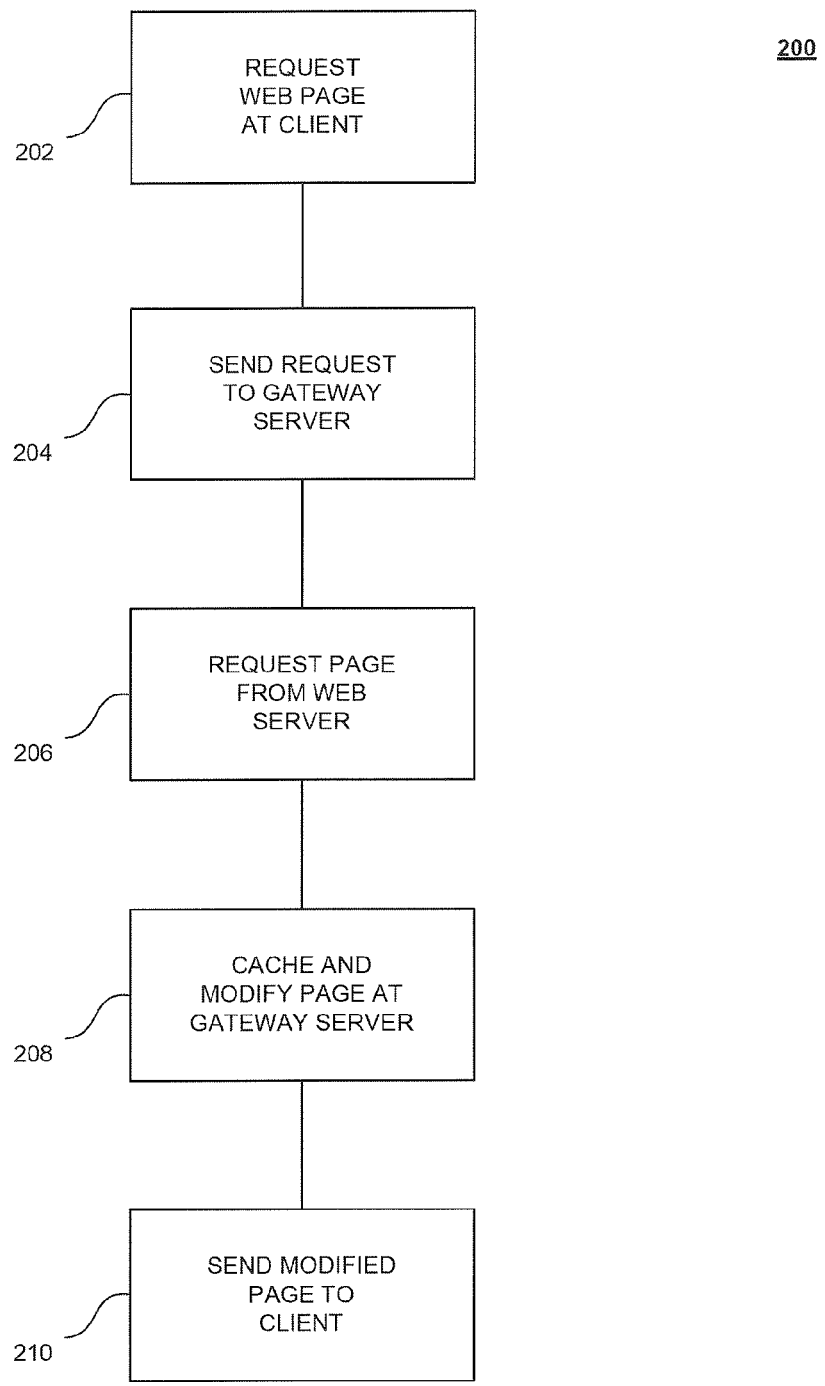
FIG. 2 is a flowchart illustrating steps by which a gateway server mediates requests for a document by a computing device, in accordance with an embodiment of the present invention.

With continued reference to FIG. 1, FIG. 2 depicts a flowchart 200 which shows the steps by which client software 104 receives information from a network, in accordance with an embodiment of the present invention. As previously noted, client software 104 may be a web browser, in which case web server 110 will provide web pages to client software 104 for display on PDA device 102 to a user. In accordance with flowchart 200, an embodiment of the present invention accomplishes the requesting and display of a web page by initiating a request for a web page at client software 104 at step 202. In accordance with an embodiment of the present invention, the request is initiated at the behest of a user, such as by the entry of a URL in the address bar of a web browser. In accordance with a further embodiment of the present invention, the request is initiated by the client software 104 in order to obtain additional data needed to complete a processing operation.

With the request generated in client software 104, PDA device 102 is operable to transmit the request to gateway server 106 at step 204. The means of transmission of the request between PDA device 102 and gateway server 106 depends on the networking capabilities of the PDA device 102. In accordance with an embodiment of the present invention, the request is transmitted using a wireless local access network ("WLAN"). In accordance with an additional embodiment of the present invention, the request is transmitted using cellular telephony communications. One skilled in the relevant arts will appreciate that additional means for the transmission of the request are contemplated by this invention, and should not be limited to any particular wireless technology. Furthermore, continued reference to wireless communications will be made for the purpose of illustration, as PDA devices such as PDA device 102 are more likely to have wireless connectivity than wired connectivity, but the same principles can be applied regardless of the connectivity medium.

Gateway server 106, upon receiving the request, acts as the intermediary between the PDA device 102 and the web server 110 containing the requested data, such as a web page. Gateway server 106 then requests the page from web server 110 over a network, such as Internet 108, at step 206. Web server 110 provides a copy of the web page to gateway server 106. Gateway server 106 caches and modifies the web page at step 208 for display on the PDA device 102 and sends this modified page to the client software 104 running on the PDA device 102 at step 210.

The manner in which gateway server 106 modifies the web page for display on the PDA device 102 depends on the capacities of the PDA device 102. As previously noted, PDA device 102 may have a small display device, limited graphical capabilities, limited communication bandwidth capabilities, or other resource limitations preventing the display of a richly detailed web page in its native form.

When gateway server 106 receives a web page from web server 110, it caches and modifies the page at step 208, as noted above, in accordance with an embodiment of the present invention. When a page is cached, a subsequent request at step 204 will result in the gateway server 106 checking for a cached version of the requested page and, if it is cached, sending the cached page to the client at step 210. This allows the gateway server 106 to skip steps 206 and 208, eliminating communications between the gateway server 106 and the web server 110 for that particular page.

However, many web pages are frequently updated, and it is beneficial to provide a mechanism by which the gateway server 106 can ensure that its cached copy of a page is equivalent to the most recent copy hosted by the web server 110. In accordance with an additional embodiment of the present invention, a cache invalidation mechanism is provided through the use, for example, of an expiry time for the cached page, the expiry time obtained from the web server 110 when the page is requested. In accordance with a further embodiment of the present invention, the cache invalidation mechanism conforms to HTTP standards for expiration and validation of a web page. One skilled in the relevant arts will appreciate that such mechanism may include, for example, requesting a timestamp from the web server 110 representing the modification date and time for the requested page and comparing it to the date and time the cached version of the page was retrieved. Other such mechanisms will be apparent to those skilled in the relevant arts.

This request mechanism can be used not only on traditional web pages, but also on other data files, such as graphics and other text documents. Often, such additional data files are requested by the gateway server 106 from the web server 110 upon encountering a reference to the additional data files within an initial web page. Accordingly, gateway server 106 is operable to retrieve any data files available on web server 110 and can apply the above mechanisms to their retrieval, caching, and presentation. For example, a web page to be displayed on PDA device 102 may contain the underlying markup text as well as a number of graphics. Step 208 allows the gateway server 106 to cache each of the graphics files as well as the web page itself and to modify the entire web page presentation, including the graphics and any other elements, for presentation on the client software 104.

II. Updating Data on the Client Software

Figure 3:
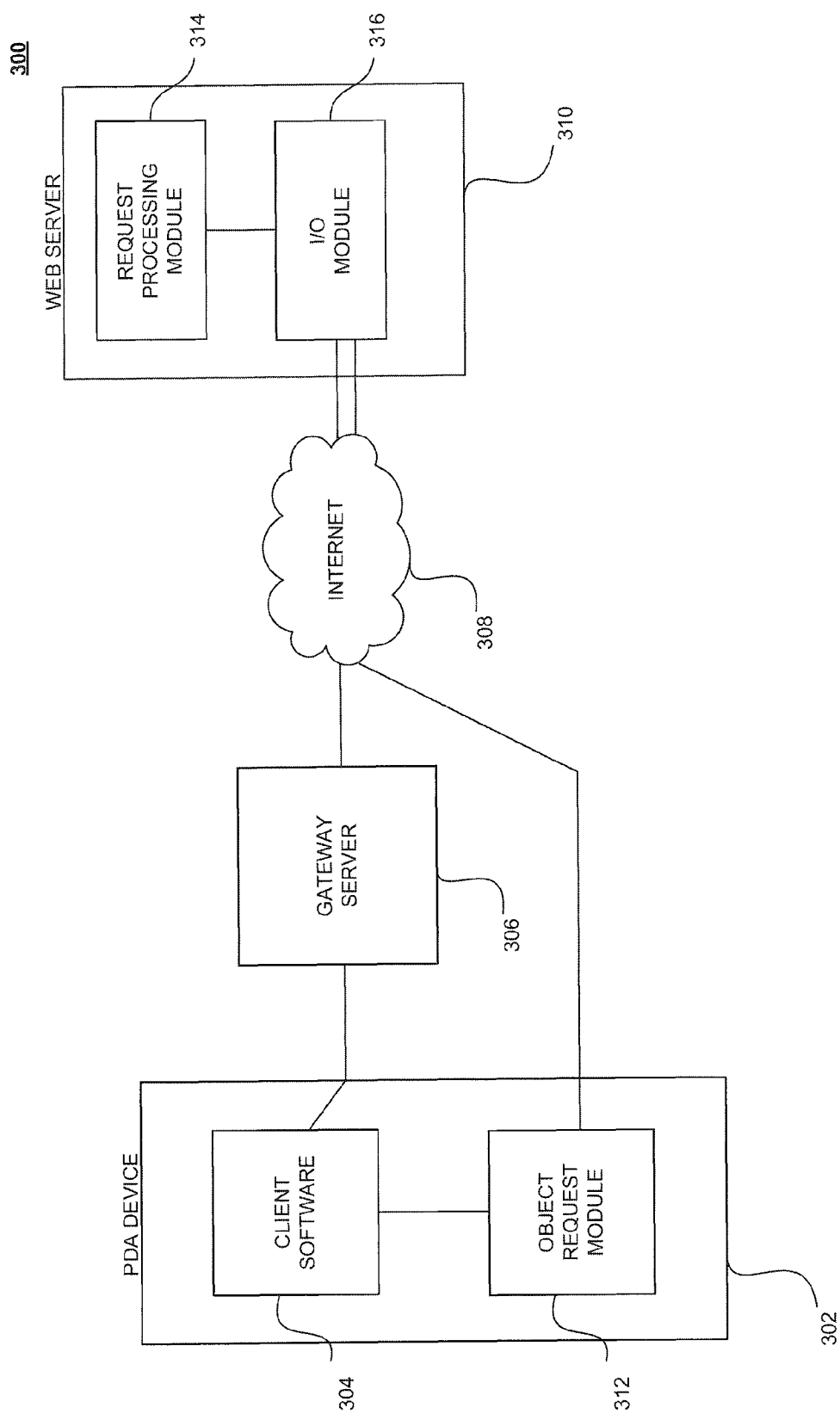
FIG. 3 illustrates a network for retrieving and updating a document for a computing device, in accordance with an embodiment of the present invention.

FIG. 3 shows a similar network 300 to network 100 of FIG. 1. A PDA device 302 with client software 304 is connected to a gateway server 306, which in turn is connected over the Internet 308 to a web server 310. Using these capabilities, each of the steps of flowchart 200 in FIG. 2 can be performed. However, network 300 provides additional capabilities for the updating of a web page requested by client software 304.

With continued reference to FIG. 2, after the gateway server 306 has sent the modified page to the client software 304, a subsequent request to that same page would once more be sent to the gateway server 306 at step 204. The gateway server would check the validity of the cached version of the page and would either retrieve a new version of the page or send the cached version of the page to the client software 304, as previously detailed. Though this process is more desirable than retrieving the entire web page from web server 310 upon every request for the page by client software 304, it still requires the retrieval of the entire page as a unit from the cache.

Furthermore, client software 304 is equipped with its own cache, in accordance with an embodiment of the present invention. As previously detailed, PDA device 302 is often limited in resources when compared with other computing devices, and accordingly PDA device 302 may not have sufficient memory resources to cache a significant number of web pages and elements included in the web pages. Methods for verifying whether the client software 304 contains the most recent version of a web page are similar to those disclosed for purposes of the cache available at the gateway server 306. Indeed, based on the teachings provided herein, it would be apparent to one skilled in the relevant arts to apply those techniques to any caching system located in the data path between a client requesting the data and a server serving the data, such as client software 304 and web server 310.

A typical web server 310 can be further separated into modules for controlling input and output 316 and for processing requests 314, in accordance with an embodiment of the present invention. One skilled in the relevant arts will appreciate that, in such an example, web server 310 refers to the physical computing device acting as a web server and all of the software executing on it. Furthermore, I/O module 316 would be, in the example, the web server software itself. For example, I/O module 316 could be Microsoft Corporation's Internet Information Services ("IIS") web server or the Apache Software Foundation's Apache web server. Request processing module 314 in the example is a module used for the provision of dynamic data to the I/O module 316. For example, request processing module could comprise processing software, such as the PHP: Hypertext Processor, and a database, such as those available from Sybase, Inc. One skilled in the relevant arts will appreciate that a number of acceptable substitutes are available and that the particular software named herein is provided by way of example and not limitation.

Tremendous inefficiencies occur when, for example, only a small amount of data contained within a page needs to be updated. The combination of request processing module 314 with I/O module 316 in modern web development has resulted in many web pages having dynamic elements within an otherwise mostly static web page. These elements are generally snippets of text, such as a stock quote, sports score, weather report, or news headline, but can be other elements as well, such as images as with CAPTCHA images.

In accordance with an embodiment of the present invention, object request module 312 is provided within PDA device 302 for the purpose of reducing the inefficiency of updating small amounts of data within an otherwise static document.

Documents, such as web pages, provided to client software 304 have a number of objects identified within them. In a web page displaying financial information about a share of stock, such an object may be, for example, the current price of a share. This information is highly dynamic in nature whenever markets are open, and as such are constantly being updated. Object request module 312 is operable to retrieve individual objects, such as the current share price, over the Internet 308 from the web server 310. This updated object can then be replaced within the document in which it is located, such as the web page, to give the user a copy of the most recent document without the need to reload the entire document.

III. Object Management

Figure 4:
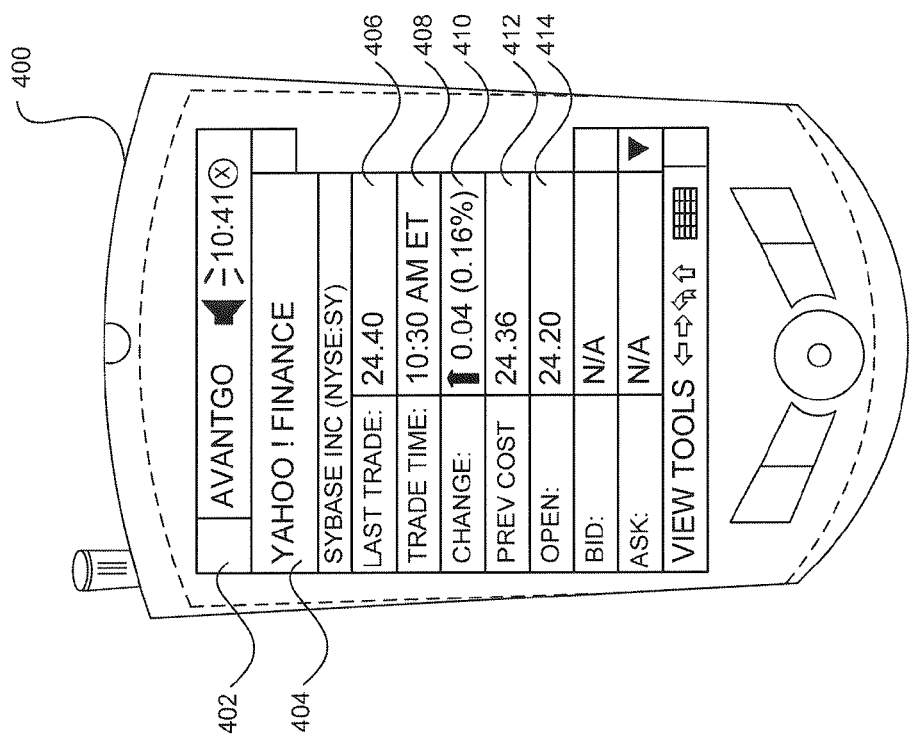
FIG. 4 illustrates a computing device displaying dynamic data elements, in accordance with an embodiment of the present invention.

FIG. 4 illustrates an example PDA device 400 running client software 402, a web browser, in accordance with an embodiment of the present invention. Web browser 402 is shown displaying a web page 404, such as Yahoo! Inc.'s "Yahoo! Finance" stock page. One skilled in the relevant arts will appreciate that different web pages will display differently on particular implementations of client software 402 and the particular PDA device 400 on which it is operating. In this example, web page 404 contains a number of data elements for a user to view relating to a stock. FIG. 4 shows data for the last traded price of a stock 406, the time of the trade 408, the change in price 410, the previous closing price 412, and the stock price at the time the markets opened 414.

Elements 406, 408, and 410 are examples of data objects that are constantly being updated, at least while the markets are open. Elements 412 and 414 are examples of data objects that are only moderately dynamic, each only changing once per day in which the markets are open. The remaining elements of web page 404, including text such as "Last Trade" and "Trade Time" are completely static, and retrieving this text repeatedly would promote wasteful resource usage.

With continued reference to FIGS. 2 and 3, web page 404 is initially unavailable in any cache, either within PDA device 302 or gateway server 306. At step 202, the web page 404 is requested by a user of the PDA device 302. At step 204, the request is sent to gateway server 306 and requested from web server 310 at step 206. At step 208, the resulting web page is cached at gateway server 306 and modified for presentation on PDA device 302. This modified page is sent to client software 304 at step 210 for display. Web page 404 is an example of such a modified page, as this page may appear differently on a typical PC or other computing device with additional resource availability.

By performing the steps of flowchart 200, an entire web page such as web page 404 is obtained from web server 310. Elements on this page, such as element 406, are obtained together with the web page 404 and contain the data available at the time of the request. In accordance with an embodiment of the present invention, page elements which are dynamic in nature, such as page element 406, are provided by request processing module 314 to I/O module 316 as they are generated. Accordingly, request processing module 314 is operable to provide the most recently available data for page element 406 at the time that a request is made.

With object request module 312 available, it is possible to update individual page elements, such as element 406, without the need to retrieve the entire page 404 again. Object request module 312 is operable to determine that element 406 is an updating element. In accordance with an embodiment of the present invention, client software 304 tells object request module 312 that element 406 must be updated at a certain interval. At each interval, object request module 312 connects to web server 310 over the Internet 308 and requests only the data it seeks to update, such as that contained within element 406. In an alternative embodiment, client software 304 tells object request module 312 whenever it wishes to update element 406 (on-demand update as opposed to a scheduled update).

In accordance with an embodiment of the present invention, a request by the object request module 312 can be for only a particular page element, such as element 406, or for all updatable page elements, such as elements 406-414. The result data is provided to the object request module 312 in any format which is accessible by the object request module 312. In accordance with an additional embodiment of the present invention, the result data is provided as an XML document. In accordance with a further embodiment of the present invention, the result data is provided as a simple text string. One skilled in the relevant arts will appreciate that any format which object request module 312 has been programmed to accept may be applied to the result data provided to it by web server 310.

Upon receipt of the result data, object request module 312 notifies client software 304 that it has received an update, and sends this data to the client software 304 for display within the appropriate location in the document. In the example web page 404 shown in FIG. 4, when a data update is received for element 406, the new value will replace the previous value, such that "24.40" in the example may now read "25.00", with the remainder of the web page not being otherwise updated.

IV. Detailed Network Implementation

Figure 5:
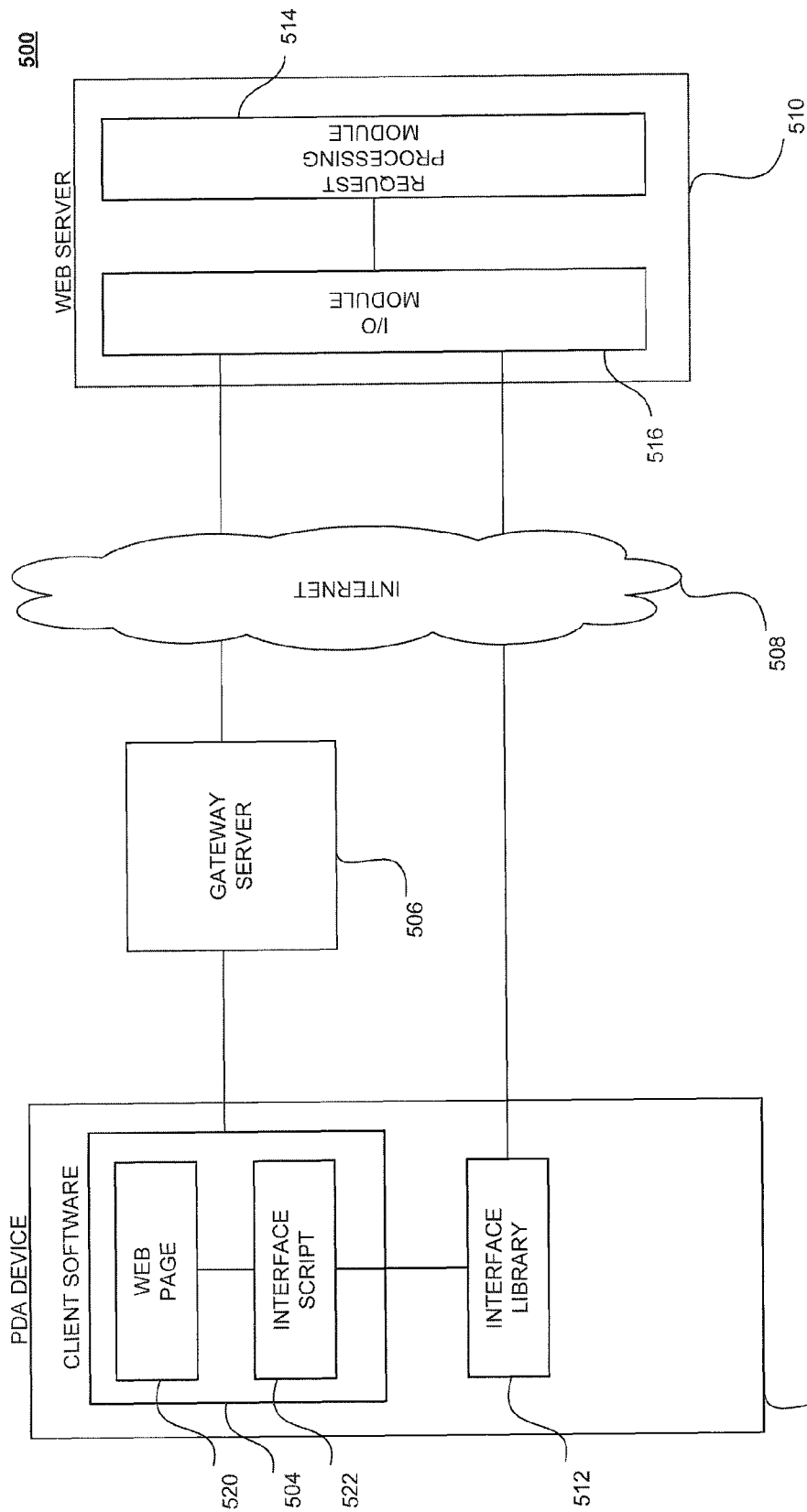
FIG. 5 illustrates a network for retrieving and updating a document for a computing device using an interface script and an interface library, in accordance with an embodiment of the present invention.

FIG. 5 illustrates a more detailed network 500 of network 300 shown in FIG. 3, in accordance with an embodiment of the present invention. FIG. 5 will be further described with reference to FIG. 6, which is a signal flow/interaction diagram for the various components shown in FIG. 5.

In accordance with an embodiment of the present invention, object request module 312 of FIG. 3 is implemented as two components, interface script 522 and interface library 512, with the interface script 522 running within client software 504 and the interface library 512 running elsewhere within the PDA device 502. One skilled in the relevant arts will appreciate that the particular implementation will depend on the level of integration a developer of client software 504 wishes to use and the availability and functionality of interface library 512. Typically, interface library 512 is a library available with the operating system of PDA device 502, such as Microsoft's XML framework, but one skilled in the relevant arts will appreciate that the boundary between interface script 522 and interface library 512 is not necessarily well-defined and is dependant on particular implementations.

The interaction of the various components will now be described. In accordance with an embodiment of the present invention, client 602 sends gateway server 608 a request page message 612. Assuming this data has not been previously cached (as previously disclosed), gateway server 608 sends a request page message 614 to web server 610. Web server 610 replies to gateway server 608 with the page in a reply message 616. At this point, gateway 608 will cache a version of the page and modify it for display on client 602. A reply 618 to request 612 with the modified page is sent by the gateway server 608 back to the client 602.

Referring again to FIG. 5, at this point client software 504 now has a copy of web page 520 comprising the most recent data available for the page. However, as certain elements of the page become outdated, it is necessary for client software 504 to retrieve updated information for those elements. This update is accomplished by sending a request through interface script 522 to interface library 512 directly to web server 510 for the data and incorporating the reply into the web page 520. Furthermore, when client software 504 requests an update through interface script 522, client software 504 is operable to provide a means by which interface script 522 can notify client software 504 of the availability of the updated data. In accordance with an embodiment of the present invention, client software 504 specifies a callback function to interface script 522 when the update request is made. When interface script 522 has obtained the updated data, it passes the updated data to the callback function it has obtained a reference to.

Figure 6:
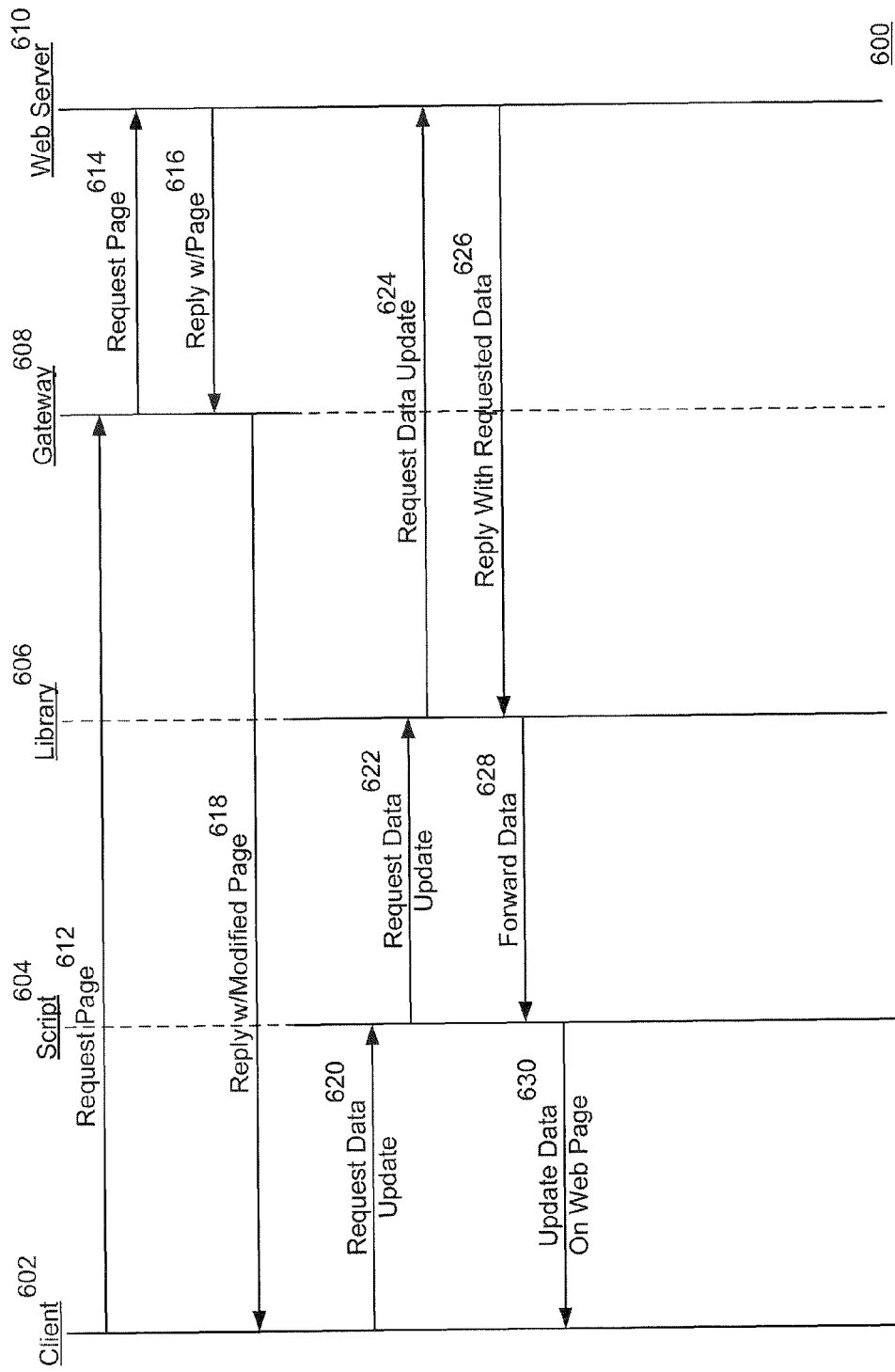
FIG. 6 is a signal flow/interaction diagram illustrating steps by which a computing device is operable to retrieve and update a document, in accordance with an embodiment of the present invention.

The remaining interactions in FIG. 6 illustrate how elements are updated in accordance with an embodiment of the present invention. Client 602 sends a request 620 to script 604 for the data to update, the request specifying a callback function within client 602. The script 604 forwards this request to library 606 in a message 622. The library 606 is then operable to request 624 the update directly from web server 610. Web server 610 provides only the requested data in a message 626 to library 606, rather than providing the entire page. This reply is forwarded 628 to the script 604. Script 604 then updates the data 630 on client 602 by calling the callback function with the updated data. The callback function then updates the web page as displayed. After the aforementioned interactions are performed, client software 504 in FIG. 5 has the most recent version of web page 520 without necessitating an entire update of the page through gateway server 506.

V. Example Detailed Interface Implementation

Figure 7:
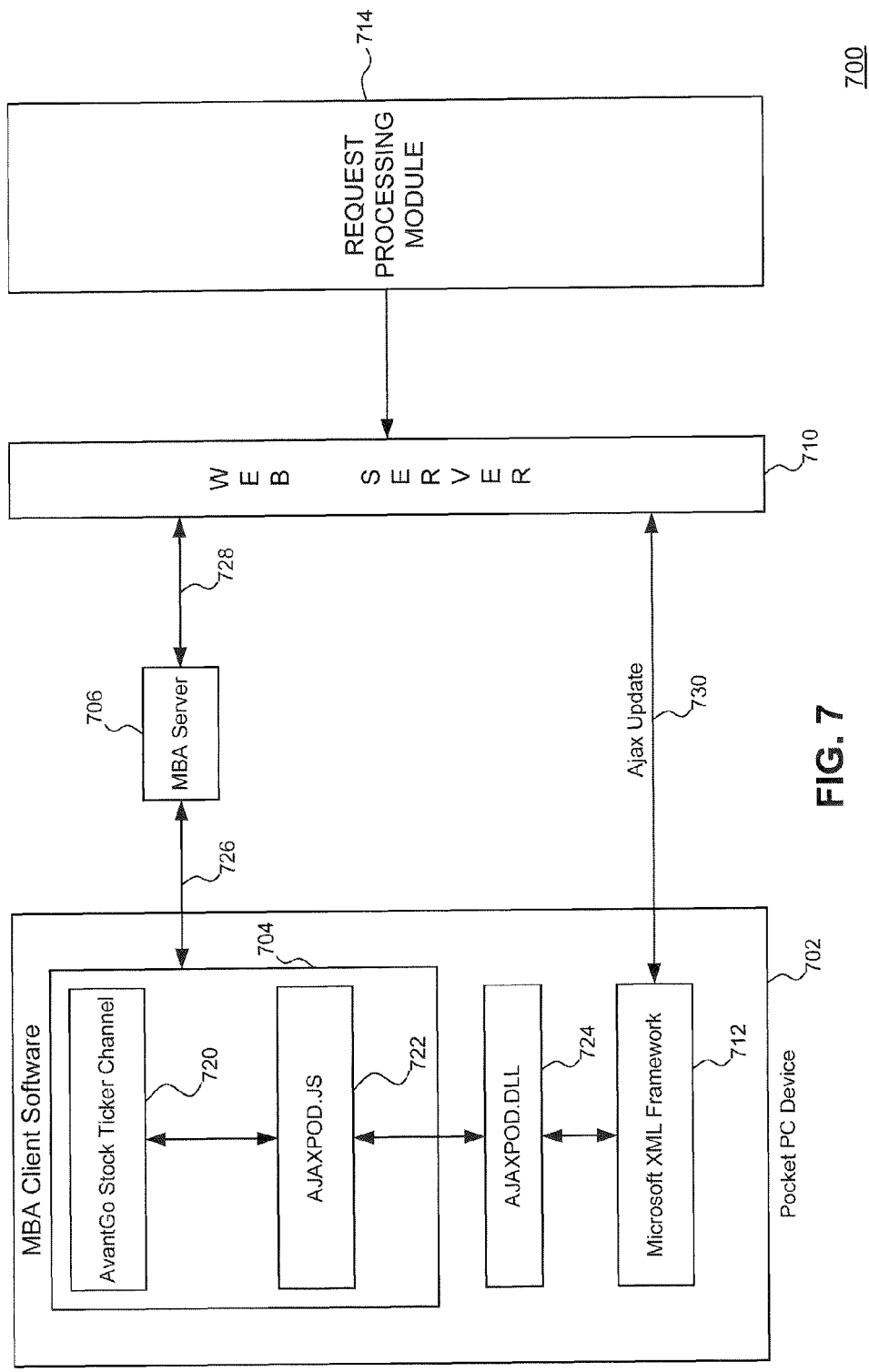
FIG. 7 illustrates a network for retrieving and updating a document for a Pocket PC device using the Microsoft XML framework and M-Business Anywhere client software developed by iAnywhere Solutions, Inc., in accordance with an embodiment of the present invention.

FIG. 7 illustrates an example implementation of the object updating methodology in a network 700 utilizing a Microsoft Pocket PC device 702 running M-Business Anywhere ("MBA") client software 704, as developed by iAnywhere Solutions, Inc., in accordance with an embodiment of the present invention. It would be apparent to one skilled in the relevant arts, applying the principles provided herein, to use this disclosure to create a functionally equivalent network to network 700 using variations of hardware and software. Accordingly, the example of FIG. 7 is provided solely for purposes of illustration, and not limitation, and the invention is not limited to any specific hardware and software disclosed herein.

In the particular implementation in FIG. 7, Pocket PC device 702 is operable to execute a Microsoft operating system capable of running the Microsoft XML framework 712. In accordance with an embodiment of the present invention, this framework is either included with the operating system or otherwise provided by a third party not necessarily affiliated with the developer of client software 704. AJAXPOD.DLL 724 is a library provided by the developer of client software 704 for the purpose of simplifying interactions with framework 712, in accordance with an embodiment of the present invention. With reference to FIG. 5, Microsoft XML framework 712 together with AJAXPOD.DLL 724 is an example of an interface library 512, though interface library 512 may comprise additional or fewer capabilities relevant to the practice of the present invention, particularly when offset with the capabilities included in interface script 522 or AJAXPOD.JS 722. One skilled in the relevant arts will appreciate that on some computing platforms, a developer of client software 704 will need to provide all of framework 712, library 724, and script 722, and will have to provide library 724 and script 722 at a minimum. In accordance with an additional embodiment of the present invention, the various components presented herein conform to the Asynchronous JavaScript and XML ("Ajax") web development technique, though one of skill in the relevant arts will appreciate that other technologies can be used together to produce an equivalent result.

With continuing reference to FIG. 6, a client 602 requests a page 612 from gateway server 608. Referring to FIG. 7, MBA client software 704 accordingly requests a channel 720 from MBA server 706. A channel within the MBA client software 704 is simply a web page that has been modified by MBA server 706 for display on device 702, and is consistent with what has heretofore been described as a modified web page.

MBA server 706 requests a page with request page message 614 from web server 710. Web server 710 obtains the necessary data from request processing module 714 for providing the web page, and replies to MBA server 706 in a reply message 616 with the requested page. MBA server 706 caches and modifies the requested page to generate a channel and provides the channel to MBA client software 704. In the example shown in FIG. 7, the requested web page is Avant-Go's Stock Ticker Channel 720, as provided by iAnywhere Solutions, Inc.

With the channel available to MBA client software 704, the next step is to update any dynamic objects within the channel. The update is initiated by a request for update 620 by the MBA client software 704 at the request of channel 720. In accordance with an embodiment of the present invention, the request is performed by registering an event occurring at a particular interval which calls a function within script 722. One skilled in the relevant arts will appreciate that any number of methods exist by which a particular function in script 722 can be initiated. In accordance with an embodiment of the present invention, channel 720 is a web page in HTML format with Cascading Style Sheets ("CSS") and script 722 is written using the JavaScript programming language. Accordingly, a number of other programmatic methods of calling an update function are available such as, for example, the OnLoad( ) and OnClick( ) methods which cause a function to be triggered upon the loading of a page element or upon a user click on a page element, respectively.

When the update function within script 722 is called at the request of channel 720, as in request 620, script 722 is further notified of a callback function within script 722. In accordance with an embodiment of the present invention, channel 720 comprises a JavaScript function acting as the callback function, a reference to which is passed to the script 722 upon a request for update.. The callback function is operable to update a particular element within channel 720 when script 722 utilizes the callback function to provide updated data to channel 720. In accordance with an embodiment of the present invention, the element to be updated is specified within the callback function using HTML attributes and the Document Object Model ("DOM"), although one skilled in the relevant arts will appreciate that any designation that can be programmatically recognized can be used. In accordance with an embodiment of the present invention, a reference to the callback function is retained by script 722 so that the script knows how to pass subsequent data updates back to the channel 720 for display.

In accordance with an embodiment of the present invention, script 722 then requests an update of the data element with request 622 from library 724. In accordance with an embodiment of the present invention, and as previously disclosed, library 724 may be located within client software 704 or may be external to it, and may further be integrated with framework 712 if the framework is also provided by the developer of client software 704. Library 724 acts as a wrapper library for framework 712, enabling the functionality needed by script 722 for requesting those elements that are to be updated from web server 710. One skilled in the relevant arts will appreciate that techniques such as the DOM can be used to identify particular data elements within a web page to be updated by script 724.

Library 724 then tells framework 712 that it needs a certain dataset which can be retrieved from web server 710. This request 624, Ajax Update call 730, requests only the necessary data from the web server 710. Web server 710 replies 626 with the requested data to the framework 712. In accordance with an embodiment of the present invention, the requested data is in XML format. One skilled in the relevant arts will appreciate that the requested data can be in any format where the data of relevance to the updated data element is discernable. This data is then forwarded 628, using library wrapper 724, to script 722. One skilled in the relevant arts will appreciate that this forwarding can occur in a number of ways, including, but not limited to, the registering of a callback function within the script 722 with library 724 that library 724 can pass the updated data to when it is ready.

With the updated data now available to script 722, the channel data 720 is updated 630. This is accomplished within script 722 by calling the previously specified callback function located within channel 720 and passing the updated data to the callback function. The callback function is then operable to locate the element to be replaced and to replace it with the updated data. In accordance with an embodiment of the present invention, the element is labeled using HTML attributes. One skilled in the relevant arts will appreciate that any method of identifying and replacing the updated element may be used.

In accordance with a further embodiment of the present invention, requests over Ajax Update call 730 to the web server include a parameter indicating what data is desired. This data is used by the web server 710 to indicate to request processing module 714 that it should only provide the requested data. Accordingly, the result returned from web server 710 is usually a minimal amount of data relative to retrieving the entire channel 720. One skilled in the relevant arts will further appreciate that it is also possible to retrieve the entire channel 720 over Ajax Update 730 and then use script 722 to only update those parts of channel 720 which have changed, but this method lacks some of the benefits of requesting only the updated data from the web server 710.

In accordance with an additional embodiment of the present invention, script 722 is not integrated into client software 704 and is instead retrieved together with channel 720 from web server 710 via MBA server 706. Through the use of a common script 722 reusable by several channels such as channel 720, each channel is operable to register callback functions with script 722 that update different elements within channel 720 without the need for a developer of channel 720 to rewrite parts of script 722.

VI. Example for Synchronizing the Gateway Server Cache

Figure 8:
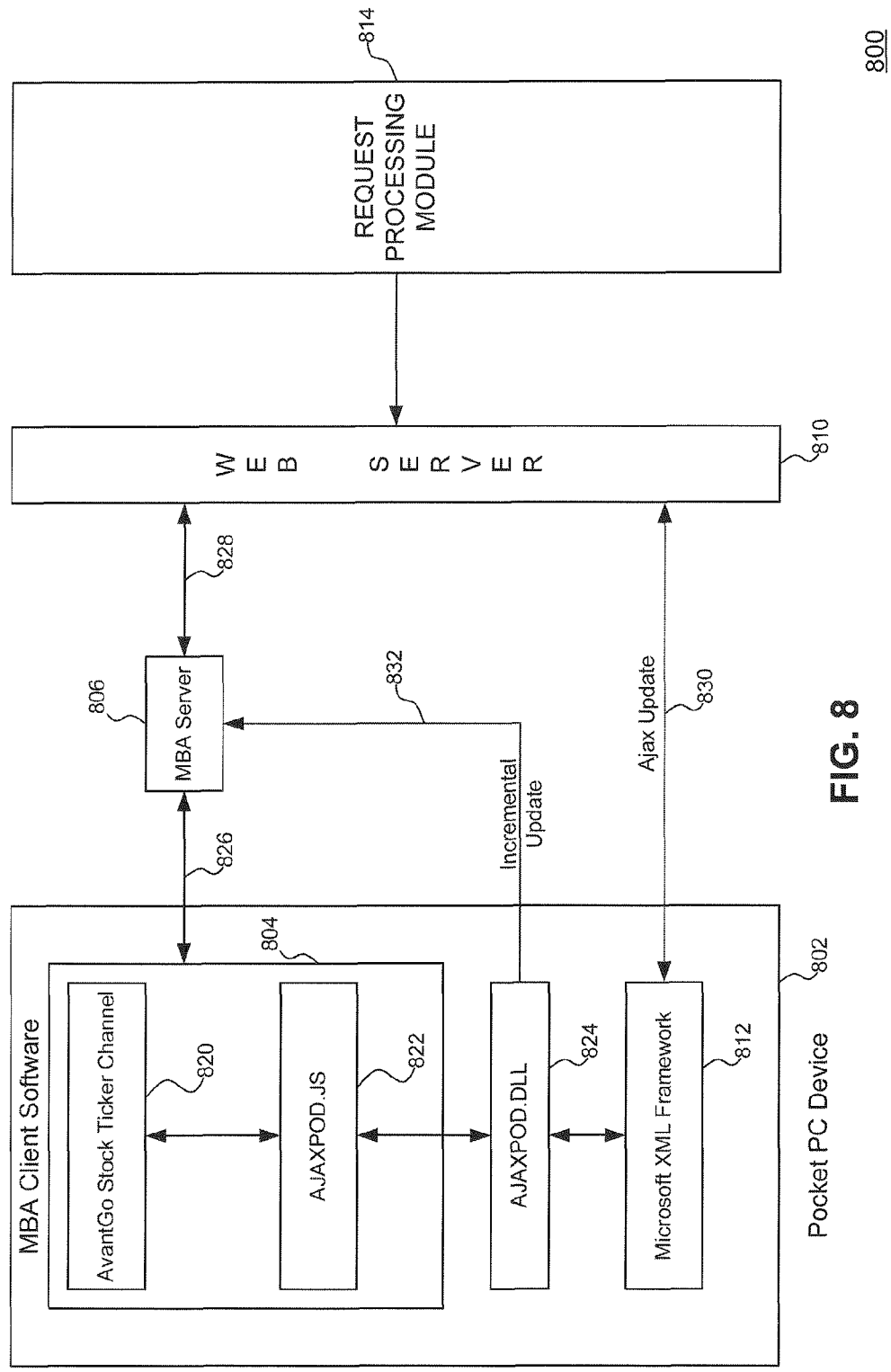
FIG. 8 illustrates a network for retrieving and updating a document for a Pocket PC device using the Microsoft XML framework and M-Business Anywhere client software developed by iAnywhere Solutions, Inc. that provides incremental updates for an M-Business Anywhere server, in accordance with an embodiment of the present invention.

FIG. 8 illustrates an example network 800 implementing additional functionality to enable synchronizing cached data stored at a gateway server such as MBA server 806 with data retrieved using Ajax Update 830. In order to accomplish this update, MBA server 806 is operable to cache data objects rather than entire web pages. In accordance with an embodiment of the present invention, MBA server 806 retrieves XML files comprising data objects from server 810 rather than web pages. One skilled in the relevant arts will recognize, however, that even a web page can be properly segmented into different "objects" which can be updated by this methodology.

When an Ajax Update 830 is performed, the retrieved data is received by framework 812 and wrapper library 824 accordingly. This data is then forwarded to MBA server 806 as an incremental update 832, which MBA server 806 incorporates into its cached version of the page, in accordance with an embodiment of the present invention. MBA server 806 can then indicate that it has the most recent version of the page, should a subsequent request for the page be received from client 804.

Figure 9:
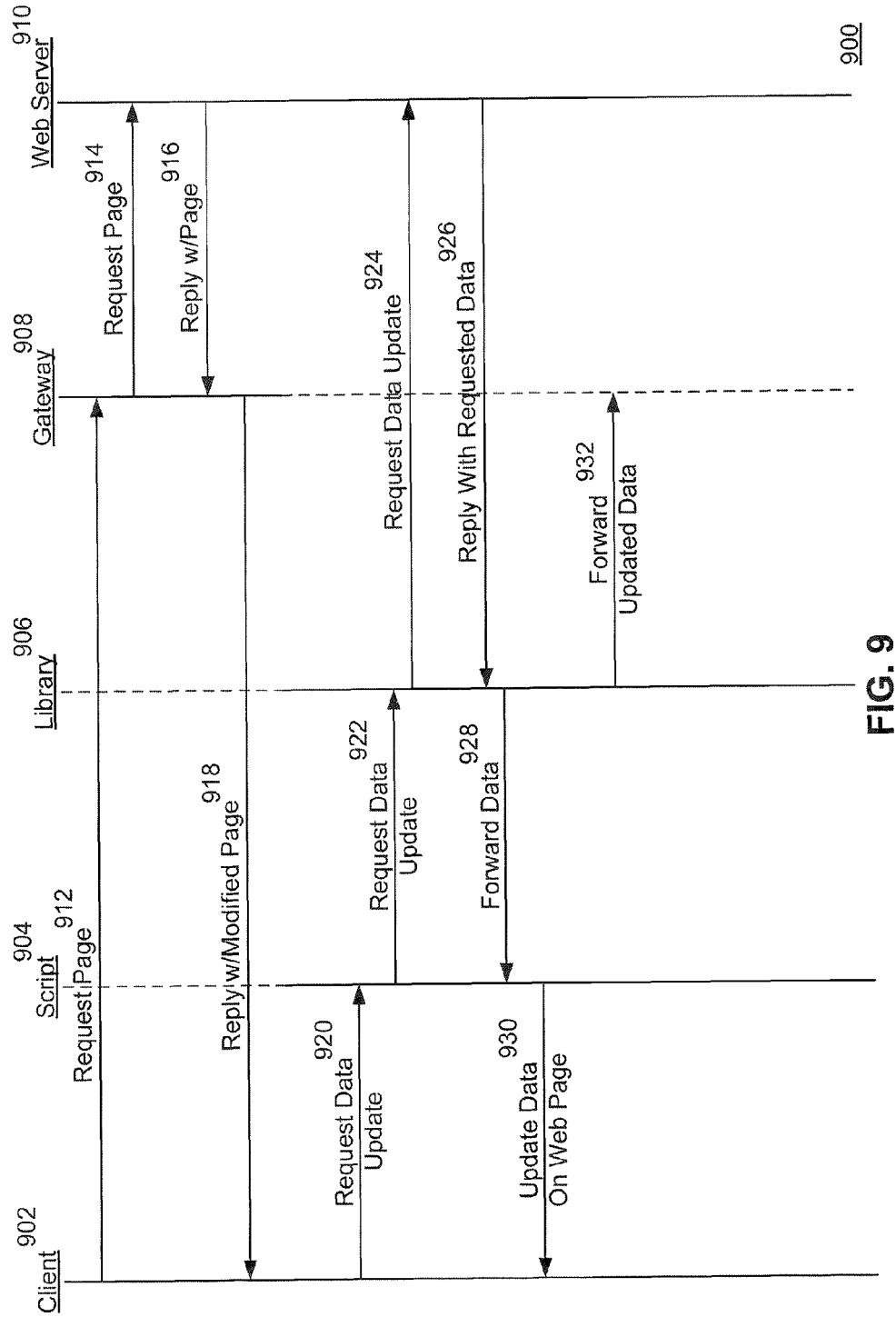
FIG. 9 is a signal flow/interaction diagram illustrating steps by which a computing device is operable to retrieve and update a document and further notify a gateway server of an incremental update, in accordance with an embodiment of the present invention.

FIG. 9 is an interaction diagram 900 further illustrating this process. Interaction diagram 900 is similar to interaction diagram 600 in FIG. 6 except it includes the further step of forwarding the updated data 832 from library 806 to gateway 808, in accordance with an embodiment of the present invention. One skilled in the relevant arts will appreciate that library 806 need not be the component responsible for forwarding the updated data, and in fact one of several components in PDA device 802 may do so.

Figure 10:
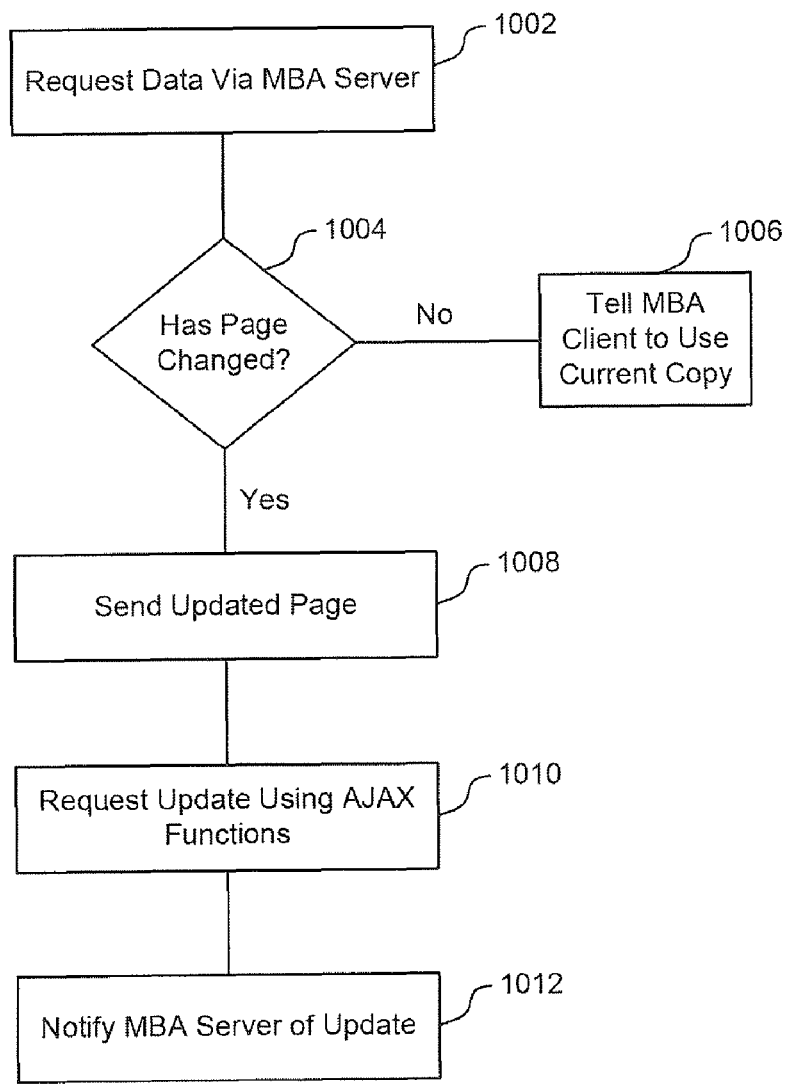
FIG. 10 is a flowchart illustrating steps by which a computing device is operable to retrieve and update a document and further notify a gateway server of an incremental update, in accordance with an embodiment of the present invention.

FIG. 10 is a flowchart 1000 that further illustrates this process. At step 1002, data is requested from MBA server 806. At step 1004, MBA server 806 determines whether the data has changed and, if not, tells the MBA client 804 to use the current copy of the data at step 1006. If the data has changed, the updated data is sent to the client at step 1008. Further updates are performed using Ajax functions at step 1010, such as Ajax Update 830. Finally, at step 1012, MBA server 806 is notified of the updates performed by using Ajax.

VII. Queuing Data Update Requests

In accordance with an embodiment of the present invention, data updates using Ajax technology are performed on a wirelessly networked PDA device. The wireless PDA device may be networked using, for example, WLAN or cellular telephony communications. One problem with wireless communications is the lack of availability in certain locations, though availability problems apply to networked communications as well. In accordance with a further embodiment of the present invention, the PDA device is operable to queue Ajax data update requests for future transmission and update in the event that the PDA device is unable to establish communications with a source server.

Figure 11:
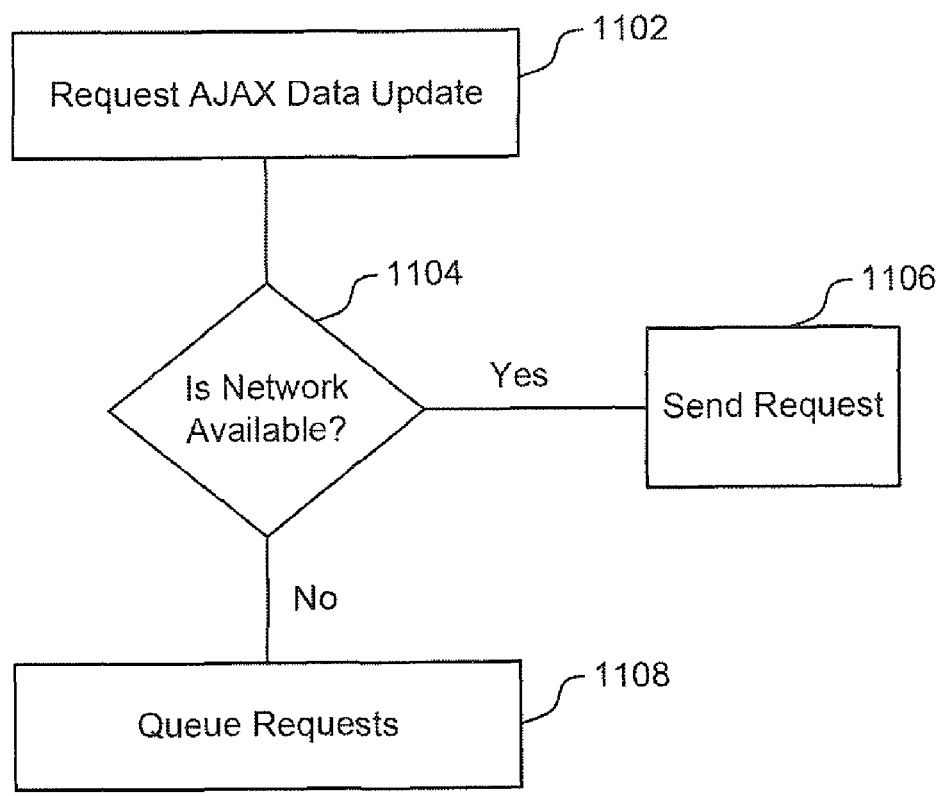
FIG. 11 is a flowchart illustrating steps by which a computing device is operable to queue updates to a document pending the availability of a network, in accordance with an embodiment of the present invention.

FIG. 11 depicts a flowchart 1100 comprising steps by which such queuing is performed in accordance with an embodiment of the present invention. At step 1102, an Ajax data update is requested, such as Ajax update 830 in FIG. 8. At step 1104, a determination is made as to whether the network is available. Such determination is made by, for example, checking to see whether access to a cellular network is available, attempting to contact the source server, checking for a network heartbeat, or one of many other methods readily apparent to those persons skilled in the relevant arts. If the network is available and access to the server can be established, than the request is sent as usual at step 1106. If access is not available, than requests are queued at step 1108. Once the network becomes available again, all requests queued at step 1108 are transmitted, and their results are used to update documents on the PDA device.

One benefit to queuing data requests is that it allows users to continue performing tasks even if they do not immediately have access to a network and cannot see the results of their requests reflected immediately. Such behavior can lead to reduced frustration by a user with the system.

VIII. Client Software Preferences

Figure 12:
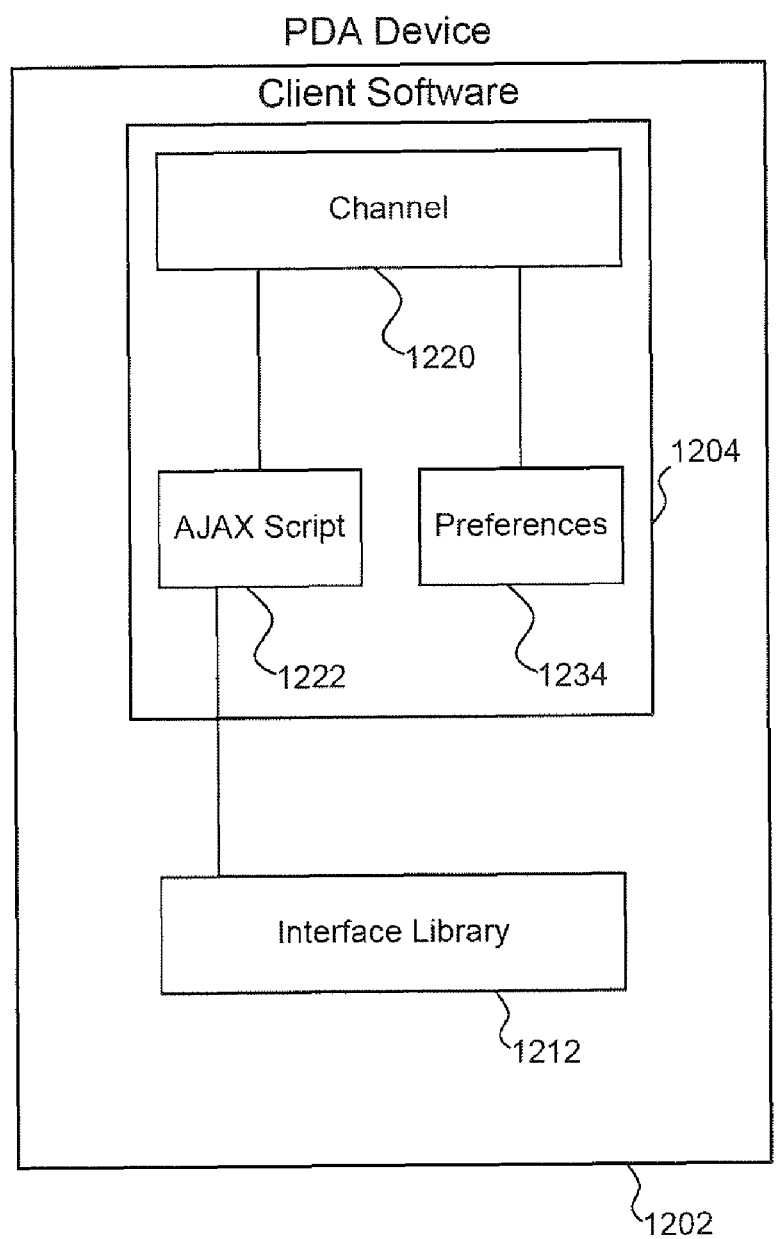
FIG. 12 illustrates a computing device operable to use preference information to modify the process by which the computing device is operable to retrieve and update a document, in accordance with an embodiment of the present invention.

In accordance with an embodiment of the present invention, preferences may be set either by a user or client software governing how data updates are performed. FIG. 12 illustrates PDA device 1202 running client software 1204. Client software 1204 comprises a channel 1220, a script 1222, and preferences 1234. Like channel 1220 and script 1222, preferences 1234 may be retrieved from a web server, or they may be configured locally by client software 1204, channel 1220, or a user of PDA device 1202.

Preferences 1234 are used in order to control what data is subject to updating through the use, for example, of Ajax technology, in accordance with an embodiment of the present invention. For example, if channel 1220 is a channel for the display of stock information, a user may enter into preferences 1234 those stocks for which an update should be performed, limiting the amount of data requested in an Ajax update. The user, client software 1204, or channel 1220 may elect to set other available parameters such as, for example, the frequency of Ajax updates, whether or not to synchronize an MBA server with data received in an Ajax update, and other functionality as appropriate. One skilled in the relevant arts will appreciate that many of the aforementioned functions performed in an Ajax update can be adjusted for performance through the use of a preferences module such as preferences 1234, and that the benefit of such adjustments may depend on the particular needs of channel 1220.

IX. Example Computer System Implementation

Figure 13:
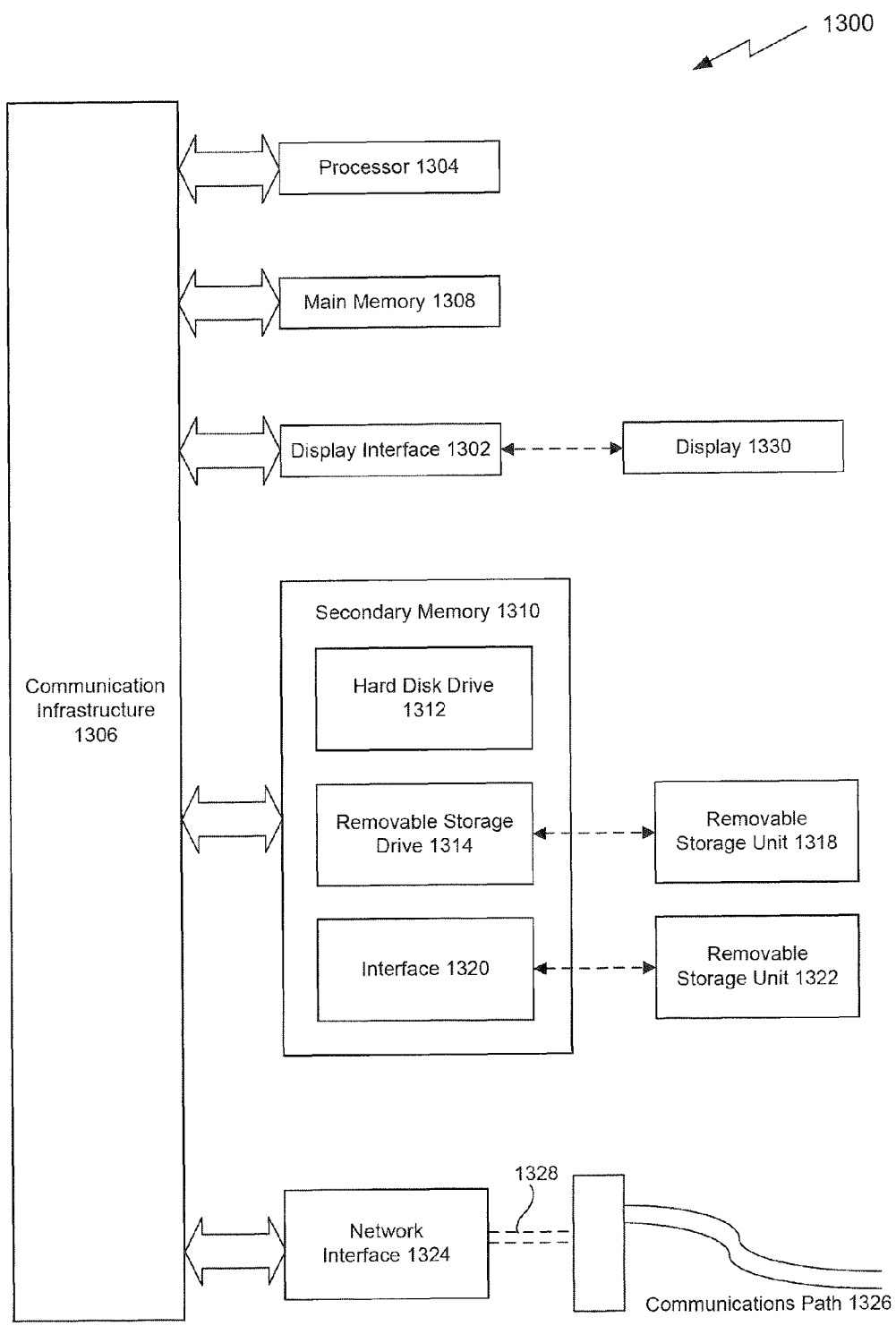
FIG. 13 depicts an example computer system in which the present invention may be implemented.

Various aspects of the present invention can be implemented by software, firmware, hardware, or a combination thereof. FIG. 13 illustrates an example computer system 1300 in which the present invention, or portions thereof, can be implemented as computer-readable code. For example, the methods illustrated by flowcharts 200 of FIG. 2, 1000 of FIGS. 10, and 1100 of FIG. 11 can be implemented in system 1300. Various embodiments of the invention are described in terms of this example computer system 1300. After reading this description, it will become apparent to a person skilled in the relevant art how to implement the invention using other computer systems and/or computer architectures.

Computer system 1300 includes one or more processors, such as processor 1304. Processor 1304 can be a special purpose or a general purpose processor. Processor 1304 is connected to a communication infrastructure 1306 (for example, a bus or network).

Computer system 1300 also includes a main memory 1308, preferably random access memory (RAM), and may also include a secondary memory 1310. Secondary memory 1310 may include, for example, a hard disk drive 1312, a removable storage drive 1314, and/or a memory stick. Removable storage drive 1314 may comprise a floppy disk drive, a magnetic tape drive, an optical disk drive, a flash memory, or the like. The removable storage drive 1314 reads from and/or writes to a removable storage unit 1318 in a well known manner. Removable storage unit 1318 may comprise a floppy disk, magnetic tape, optical disk, etc. which is read by and written to by removable storage drive 1314. As will be appreciated by persons skilled in the relevant art(s), removable storage unit 1318 includes a computer usable storage medium having stored therein computer software and/or data.

In alternative implementations, secondary memory 1310 may include other similar means for allowing computer programs or other instructions to be loaded into computer system 1300. Such means may include, for example, a removable storage unit 1322 and an interface 1320. Examples of such means may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1300.

Computer system 1300 may also include a communications interface 1324. Communications interface 1324 allows software and data to be transferred between computer system 1300 and external devices. Communications interface 1324 may include a modem, a network interface (such as an Ethernet card), a communications port, a PCMCIA slot and card, or the like. Software and data transferred via communications interface 1324 are in the form of signals which may be electronic, electromagnetic, optical, or other signals capable of being received by communications interface 1324. These signals are provided to communications interface 1324 via a communications path 1326. Communications path 1326 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1318, removable storage unit 1322, a hard disk installed in hard disk drive 1312, and signals carried over communications path 1326. Computer program medium and computer usable medium can also refer to memories, such as main memory 1308 and secondary memory 1310, which can be memory semiconductors (e.g. DRAMs, etc.). These computer program products are means for providing software to computer system 1300.

Computer programs (also called computer control logic) are stored in main memory 1308 and/or secondary memory 1310. Computer programs may also be received via communications interface 1324. Such computer programs, when executed, enable computer system 1300 to implement the present invention as discussed herein. In particular, the computer programs, when executed, enable processor 1304 to implement the processes of the present invention, such as the steps in the methods illustrated by flowcharts 200 of FIG. 2, 1000 of FIGS. 10, and 1100 of FIG. 11 discussed above. Accordingly, such computer programs represent controllers of the computer system 1300. Where the invention is implemented using software, the software may be stored in a computer program product and loaded into computer system 1300 using removable storage drive 1314, interface 1320, hard drive 1312 or communications interface 1324.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

X. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. For example, in the above, the invention has been described with reference to particular examples, such as PDAs, Pocket PC, M-Business Anywhere, Ajax, etc. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A computer-implemented method for updating a document for display by a computing device, comprising:
    receiving a document from a server, wherein the document comprises a callback function;
    determining a need to update a portion of the document, yielding an update request comprising a reference to the callback function;
    sending, based on the update request, one or more aspects of the update request to a second server using an interface library;
    receiving an update response from the second server at the interface library, the update response comprising updated information for the portion of the document determined to need an update; and
    processing the update response by at least updating the portion of the document determined to need an update, yielding an updated document.

2. The computer-implemented method of claim 1, further comprising:
    displaying the updated document within client software on the computing device.

3. The computer-implemented method of claim 2, wherein the client software is a web browser and the document is a web page.

4. The computer-implemented method of claim 1, wherein the determining is performed on a scheduled basis.

5. The computer-implemented method of claim 1, wherein the determining occurs based on an action performed by a user of the computing device.

6. The computer-implemented method of claim 1, wherein the update response comprises one of simple text or an XML document.

7. A system, having at least one processor, configured to update a document for display by a computing device, comprising:
    a first module configured to receive a document comprising a callback function from a server;
    a second module configured to determine a need to update a portion of the document, yielding an update request comprising a reference to the callback function;
    a third module configured to send, based on the update request, one or more aspects of the update request to a second server using an interface library;
    a fourth module configured to receive an update response from the second server at the interface library, the update response comprising updated information for the portion of the document determined to need an update; and
    a fifth module configured to process the update response by at least updating the portion of the document determined to need an update, yielding an updated document.

8. The system of claim 7, further comprising:
    a sixth module configured to display the updated document within client software on the computing device.

9. The system of claim 8, wherein the client software is a web browser and the document is a web page.

10. The system of claim 7, wherein the second module is further configured to determine whether a need exists to update a portion of the document on a scheduled basis.

11. The system of claim 7, wherein the second module is further configured to determine whether a need exists to update a portion of the document based on an action performed by a user of the computing device.

12. The system of claim 7, wherein the update response comprises one of simple text or an XML document.

13. A computer-implemented method for providing updated data for a document to be displayed by a computing device, comprising:
    receiving a request for a document from a computing device, wherein the document comprises a callback function operable to replace an object within the document with updated data;
    retrieving the document from a server based on the received request;
    caching a copy of the document;
    providing the requested document to the computing device; and
    providing an interface script to the computing device.

14. The method of claim 13, wherein the retrieving is performed when a local copy of the document is not available or when the local copy of the document is older than a copy of the document at the server.

15. The method of claim 14, further comprising:
    receiving an updated version of the requested document from the server; and
    updating the cached copy of the document with the updated version.

16. The method of claim 15, further comprising:
retrieving header information for the document at the server, wherein the header information comprises a timestamp identifying the time the document at the server was most recently edited;
determining when the cached copy was updated; and
comparing the time when the cached copy was updated to the timestamp.

17. The method of claim 16, further comprising:
updating the timestamp for the cached copy of the document.

18. The method of claim 15, further comprising:
modifying the document for display on the computing device.

19. The method of claim 15, wherein the document is a web page.

20. A computer-implemented method for providing updated data within a document for display by a computing device, comprising:
receiving a request to update one or more data elements contained within a document, wherein the document comprises a callback function operable to replace an object within the document with updated data;
receiving updated data for at least one of the data elements from a server; and
providing the updated data for at least one of the data elements to client software for display within an appropriate location in the document.

21. The method of claim 20, further comprising:
notifying the client software that at least one of the data elements has an available data update.

22. The method of claim 21, further comprising:
receiving a second request from the client software to send the updated data for one or more data elements in response to the notification that at least one of the data elements has an available update.

23. The method of claim 22, wherein the document is a web page.

* * * * *